T. CURTIS.
Harvester Rake.
No. 42,564. Patented May 3, 1864.
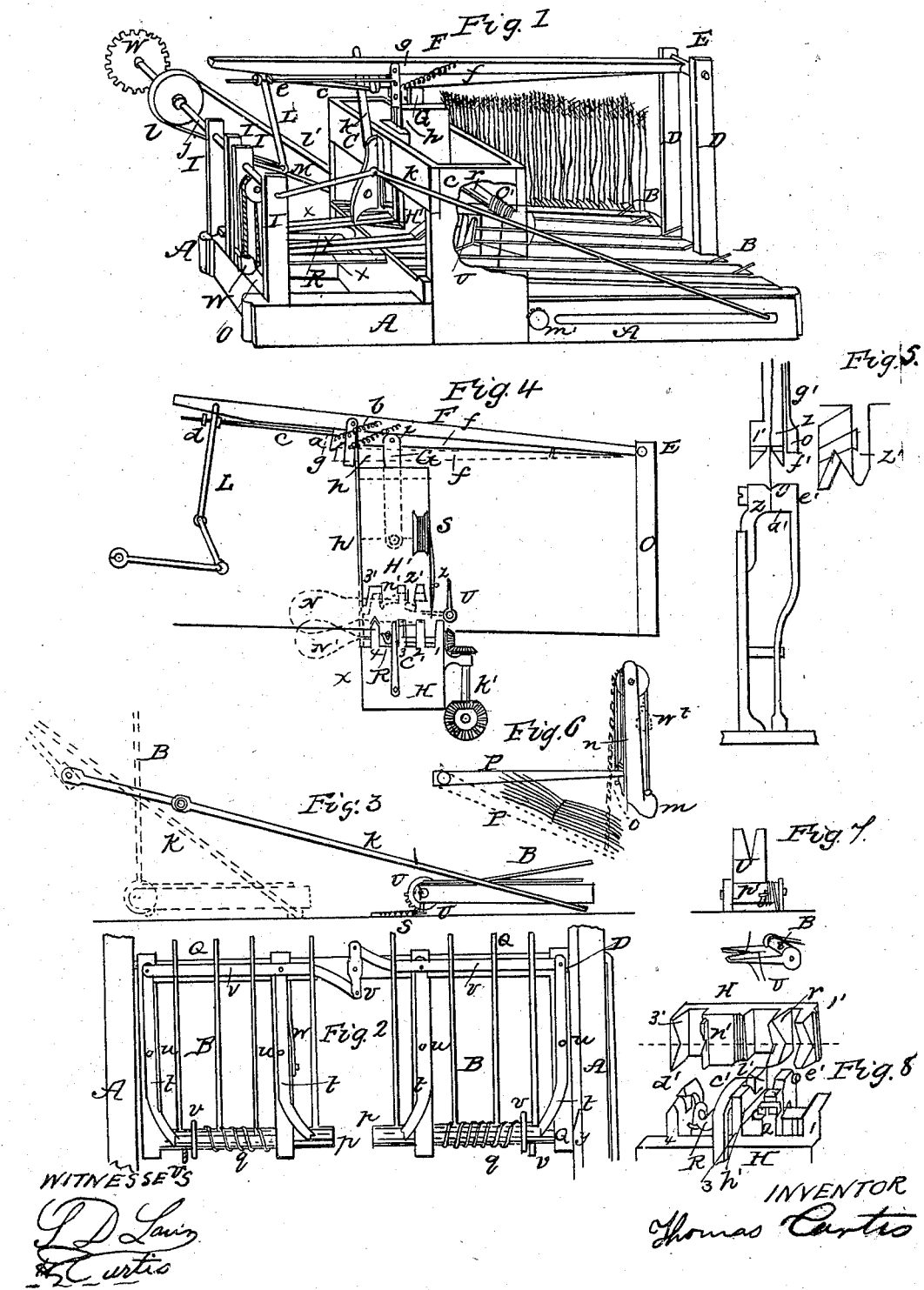

UNITED STATES PATENT OFFICE.

THOMAS CURTIS, OF NEW HUDSON, MICHIGAN.

IMPROVEMENT IN HARVESTERS.

Specification forming part of Letters Patent No. 42,564, dated May 3, 1864.

*To all whom it may concern:*

Be it known that I, THOMAS CURTIS, of New Hudson, Oakland county, State of Michigan, have invented a new and useful machine, the purpose and object of which are to rake and bind all kinds of grain as fast as it is cut by a grain-reaper, and also hold and carry the bundles, after they are bound, until a sufficient number are gathered, when they are deposited together on the ground; and I do hereby declare that the following is a full, clear, and exact description of such machine, and of its construction and manner of operation, reference being had to the accompanying drawings, and to the letters of reference marked thereon, and making a part of this specification.

Figure 1 is a perspective view of the whole combined machine. Fig. 2 is a detached view of the rake. Fig. 3 is a view of the rake in two different positions, showing also the pitman and crank that operate the rake. Fig. 4 is a side view of the binding apparatus and of the mechanism that operates its several parts. Fig. 5 is a view of detached parts of the binding apparatus. Fig. 6 is a front view of the carrier, showing it in two positions. Fig. 7 is a detached view of the band-guide. Fig. 8 is a top view of the lower or fixed part of the binding apparatus, and a bottom view of the upper or movable part thereof.

The design and intention of this invention are the production of a machine which can be attached to and operated by a grain-reaper, and which will rake and bind all kinds of grain as fast as it is cut by such reaper, and which will hold and carry along, on an extended part of such machine, the bundles, after they have been bound, until a number of such bundles are gathered, and the carrier is full, when such bundles will be deposited together upon the ground, ready to be set up in a shock. My invention is thus a combined grain-rake, binder, and gatherer.

This machine is placed behind the cutter-bar of the reaper, and receives the grain as it is cut, as does the ordinary apron or platform. It also extends back of the working parts of the reaper, so as to afford all necessary space for the binding apparatus, and also furnish a place for holding and carrying along the grain after it has been bound. The operating parts of such machine are worked by means of gearing connected with the wheels of the reaper by shafts and knuckle-joints and cog-wheels.

This machine is constructed substantially as follows: The frame A, which is made sufficiently strong to support the several parts that rest upon it, is in length about equal to the width of a reaper and its cutter-bar, and is usually about four feet wide. This frame is attached behind the reaper and cutter-bar, and close to the latter, so that it will receive the grain, as it is cut, in the same manner the ordinary apron or platform does. This part of the frame, which is in the rear of the cutter-bar, is closely and tightly covered on the under side, such covering extending also under the binding apparatus, so as to exclude dirt and other matters from the operating mechanism, and the top of such part of the frame is covered with slats, as shown in Fig. 1. Between such top and bottom coverings the rake moves backward and forward, the teeth or fingers of the rake passing in the open spaces between the slats on the upper side.

Near the middle of the frame A, leaving in the rear of the cutter-bar a space for an apron equal to the length of such cutter-bar, is a strong cross-piece, which supports the lower or fixed part of the binding apparatus, and above which is a suitable frame, C, for supporting the movable part of the binder and other movable portions of the machine. From the end of the frame next to the grain rise two posts, D D, in the upper end of which is a roller, E, to which is connected the long lever F, which works the movable part H' of the binder. From the other end of the frame rise four posts, I I I I, which support the shaft J, which shaft carries the pitman K, that moves or operates the rake, and also the pitman L, that moves the lever F up and down perpendicularly, the pitman K being connected to the shaft J by means of the crank M on one end of the shaft, and the pitman L connecting to a double crank in the center of such shaft S.

The lever F extends entirely across the frame A and underneath it, and supported from it is a short lever, *f*, which is about half the length of the lever F, and which descends or drops to cause the hand H' to catch and hold the band of the bundle, as hereinafter described, a little before such long lever F begins to descend. Such levers F and $f$ move upward at the same time, the short lever $f$ being carried up with the long lever F by means of the hook $a$, which is fixed to the lever F, and which is carried under the end of the lever $f$ and held there by a coiled spring, $b$. Such hook is detached or drawn from under the end of the lever $f$, to permit it to drop at the proper time, by the rod or wire $c$, Fig. 4, one end of which is fixed to such hook, and the other end connected to the pitman L, which, as it moves outward, comes against the nut $d$ on the end of the wire $c$, and draws the hook $a$ from under the end of lever $f$ and allows it to drop. This nut $d$ is adjustable, so as to regulate the length of the wire and govern the time of the drop of the lever $f$. The hook $a$ has also additional holes in it, to regulate the length of the wire $c$. Connected with the same pitman L, and operated by it in the same manner, is another wire, $e$, Fig 1, the other end of which connects with a hook, $g$, also fixed to the lever F, the office of which hook is to carry up the drop-rods $h\ h$, as the lever F is raised, until at a proper time the rod or wire $e$, acted upon by the pitman L, draws such hook $g$ from under the rods $h\ h$, and allows them to fall, which they do of their own weight. This hook $g$ is kept in place under the heads of the rods $h\ h$, as the lever F rises, by the coiled spring $i$, Figs. 1 and 2. These drop-rods $h\ h$ are two in number, and are placed upon the front end or edge of the movable part H' of the binder, and are intended to drop behind the grain just as it (the grain) has been carried by the rake under the press O, and into the position indicated by the curved or looped dotted line N, Fig. 4. Such rods, when they have so dropped behind the bundle, keep the straw together while it is being bound, and also prevent its falling backward between the two parts of the binder and interfering with the process of binding. These rods are intended to be dropped just about the same time the short lever $f$ is released from the hook $a$ and drops to catch and hold the band.

A little in front of such rods $h\ h$ and the binding mechanism, and moving in guides upon the side of the frame C, is a press, O, which is concave on its under side, and which is connected with the lever F by a pitman, $k$, and by which such press is moved up and down as the lever F is elevated or depressed. The end of the pitman $k$ passes loosely through the lever F, being held therein by a pin on the upper side of that lever, and a spring, $l$, on the under side of such lever, and, acting upon the pitman $k$, forces the press O down upon the bundle, while it is being bound, after the completion of which, the press is carried up by the lever F, leaving that bundle free, so that the next one brought forward by the rake will push it on the carrier P. This carrier P consists of a small frame, placed within the main frame A, between the binder and the posts I I, and hinged to the main frame at its side nearest to the body of the reaper, so that its front edge or side P' can rise and fall, as may be necessary. This carrier is supported in the proper position to receive and sustain the bound bundles by a spring, $n$, and catch $o$, Figs. 1 and 6; but when such carrier becomes filled with the bound bundles, these press against the spring $n$ and carry the catch $o$ from under the carrier, which then drops, and the bundles are deposited in a bunch on the ground. As soon as the carrier has passed away from the bundles, it is raised again to its horizontal position by the weight $w\ t$ and cord running over a pulley on one of the posts I. Fig. 6 represents the carrier in the position to receive the bundles and when discharging them on the ground.

The rake Q Q, Fig. 2, is framed, or of iron, and its length is such that it moves freely between the sides of the main frame A, and it is supported and guided, as it moves backward and forward in such frame A, by projections or tongues on the side pieces of the rake, and which move in corresponding grooves made in the side pieces of the frame A. Such manner of support is partially shown in Fig. 2. The side pieces of the rake are of sufficient length to make it run steadily in the frame A. In the front side of such rake-head are two rollers, $p\ p$, which support the teeth or fingers B B, and around which are coiled springs $q\ q$. These rollers do not meet each other in the middle of the rake, but are separated from each other far enough so that they can pass, one on each side, the binder H as the rake is moved forward with the grain. On each of these rollers is a band or geared sector, $r$, which is designed to mesh into a rack-plate, $s$, Fig. 3, fixed to the bottom of the frame A, for the purpose of rotating the rollers $p\ p$ and throwing up perpendicularly the fingers B B, to carry along the grain as the rake moves forward. The toothed band or sector $r$ is so placed on the roller $p$ that when the rake is carried backward to its extreme limit as shown in Fig. 1, and by the lines in Fig. 3, the teeth upon the sector or band $r$ will be nearly over and in gear with the rack-plate $s$. To cause these parts to meet together with absolute certainty and precision, there is fixed or placed close alongside the plate $s$ a spring, (the position of which is shown by the heavy line in Fig. 3,) which extends back a little beyond the toothed portion of the plate $s$, and against the end of which a spur, $r$, on the roller $p$ strikes, as the rake begins to move forward, and rotates the roller $p$ sufficiently to cause the teeth on the band or sector $r$ to mesh into those on the plate $s$. When the rake moves backward, the spur $r$ moves over the top of such spring, pressing it downward, and such spur passes off such spring as the rake reaches its extreme backward position, when the spring rises in front of the spur, so that the first motion of the rake forward, by the action of such spring against the spur $r'$, throws the sector $r$ and rack-plate $s$ into gear, rotating the rollers $p\ p$ and throwing up the fingers B B. To brace the fingers B B, and give them all necessary strength to carry forward the grain, there is arranged upon the rake-head a series of levers, $t\ t\ t'\ t'$, turning on pivots $u\ u\ u\ u$, and caused to move together, and toward the center of the rake, by the cross-levers $v\ v$, working on a cross-head, $v'$. A spring, $w$, acting against one of the levers $t$, carries the lower or forked ends of such lever toward the center of the rake. As the fingers B B are thrown upward, by the action of the sector $r$ and rack-plate $s$, the lower or forked ends of these levers $t\ t\ t\ t$ pass behind the fingers at the ends of the rollers $p$, and hold them in a perpendicular position, and brace them as the rake moves forward with its gathering of grain. When the rake reaches its forward limit, as shown in Fig. 3, (and at which time the fingers B B are in line with the front edge $x\ x$, Fig. 4, of the binder, and the grain is carried under the press O, and in the position indicated by the loop of dotted lines, Fig. 4,) a projection, $y$, Fig. 2, on the end of one of the levers $v$, strikes against the incline $y'$ on the side of the frame A, and draws the levers $t\ t\ t\ t$ away from behind the fingers B B, when the coiled springs $q\ q$ draw such fingers downward and backward beneath the apron, so that in the backward movement of the rake these fingers pass under the grain. The fingers B B, while they stand perpendicular, hold the grain from falling backward, but just before these fingers are drawn down and backward, as described, the drop-rods $h\ h$ are caused to fall, as before set forth, and then the grain is supported by them while it is being bound. These drop-rods $h\ h$ are also intended to drop one on each side of the band, and they thus keep the band in its proper position and prevent its being moved or carried sidewise. The press O is placed so that it moves, with respect to such rods $h\ h$, about centrally between them, and such press is intended to act upon the bundle directly over the band, and in the bottom face of such press there is made a groove, so that the band can move, as it is being bound, without interference from the press.

The binding apparatus consists of two parts, one, H, which is the bottom, and fixed to the frame A, and called the binder, and the other, H', is movable, and called the hand. The binder H is of metal, usually about two inches wide by, say, eight inches long, and having a perpendicular part rising about four inches. Upon the upper end of such perpendicular part are four projections, 1 2 3 4, Figs. 4 and 8, three of which, 2 3 4, are supported for springs to act against to hold the band. The other, 1, is a support for the shaft of the twister R, such shaft being also supported by the projection 3. The hand or movable part H' is also of metal, and has on its lower end three notched fingers, 1' 2' 3', which pass down into the spaces of the binder H, and match or act against the several projections 2 3 4, as hereafter described. To the binder H are also fixed four springs, $a'\ b'\ c'\ d'$, which act against the projections referred to, and against the hand H', to hold the band while it is being passed around the bundle and fastened thereto.

The band material is soft wire, about the size of broom-wire, which is wound upon a reel, S, from whence it is drawn off, by the action of the machine, as required.

Between the spring $a'$ and projection 2 of the binder is caught and held the end of the wire, as shown in Fig. 4, as it passes from the reel S through the needle or eye $r$. This is the end of the wire which is to form the band for the next bundle, and such spring and projection always hold the end of the wire or band for each succeeding bundle after the preceding one has been bound. The wire or band being in the position indicated in Fig. 4—that is, passing from the reel S through the eye or needle $z$—and its end being held between the projection 2 and the spring $a'$, (the action of these two parts upon each other being more plainly shown from Fig. 8,) the grain, as it is carried forward by the rake, meets the guide U, Figs. 1 and 4, which is a metal plate forked or slitted nearly its whole length, as seen in Figs. 1 and 7, and which will be more particularly described hereafter, and presses this down and forward, astride the band, and at the same time presses against the wire, causing it to pay off the reel and take the position, as the bundle is moved forward, shown by the dotted lines in Fig. 4, the grain being carried, when the rake has passed forward its full sweep, into the position of the loop N of such wire. While the grain is thus being carried along by the rake between the two parts of the binding apparatus, the hand H' is elevated to its highest position, so that the grain can pass freely between such hand and the binder H; but as soon as the grain has so passed in front of the binder the drop-rods $h\ h$ descend, as before described, and prevent the grain falling backward, and at the same time the short lever $f$ is released from the hook $a$, allowing the hand H' to fall of its own weight, catching the band or wire in the notched or forked fingers, 1 2 3, as shown in Figs. 4 and 8. As the hand H' is forced down by the lever F, the fingers upon the hand H' pass between and by the side of the projections on the binder H. As finger 1' passes down by the side of projection 2, the spur $f$, on the spring $g'$, (which is attached to the finger 1' of the hand H',) strikes against the upper inclined surface of the spur $e'$ on the spring $a'$, away from the projection 2, so as to allow the wire which has been carried down by the notched finger 1' to pass between such projection and spring $a'$. As soon as such spur $f'$ has passed below the spur $e'$ on the spring $a'$, such spring flies back against projection 2, catching and holding the wire between them. As the hand H' is raised, the spur f' passes on the outside of spur e', the spring g' yielding so as to allow such spur f to so pass up on the outer side of the other spur e', so that the spring a' is not interfered with in its hold upon the band or wire. On the side of projection 2 is a screw or flange to support the finger 1', so that the spur f' will force outward the spring a', as described.

As will be observed, when the hand H' so passes down, and the wire is carried by the finger 1' into the press between spring a' and projection 2, the end of the wire previously held between such parts will fall or be forced downward. At the same time that finger 1' carries the wire between spring a' and projection 2, the finger 2' passes down between projection 2 and 3, and forces both ends of the wire between springs b' and projection 3—the spring and projection being constructed as shown in Fig. 8, so that the wires of the band can pass between them, but not through them—by which such wires are securely held. Upon the side of the projection 3 of the binder is a horizontal knife, h', against which acts a similar knife on the side of finger 2' of the hand. As the finger 2' is pressed downward by the lever F, these knives pass each other, cutting off the wires which form the band, and the ends of which are held between the spring b' and the projection 3. The spring c' also acts, in concert with spring b', to help hold the ends of the wires, such spring c' acting, however, in an upward direction against the under surface of the hand H', while the spring b' acts horizontally against projection 3. Spring d' helps to confine or hold together the ends of the wire which has been passed around the bundle, and bring such wires so that they are caught by the twister R, the projection n' and finger 3' of the hand H' forcing the wires, as the hand is pressed down, between the spring d' and the projection 4, so that they are caught and twisted by the revolving worm or twister R.

Passing through and supported by the projections 1 and 3 of the binder H is a horizontal shaft, on one end of which is a beveled gear, Fig. 4, and on the other end of which is the twister R, which is a tapering piece of metal coiled like a worm. This twister, as it is revolved, catches the wires forming the band and twists them tightly together, the ends of the wires being drawn from the springs b' and c' by the twister. The loop N', Fig. 4, shows the position of the bundle and band as the latter is being twisted. While the bundle is so being bound, the press O is forced down upon the straw so that it is tightly compressed and held together.

Motion is communicated to the twister by means of an upright shaft, K', Fig. 4, with mitered cog-wheels at each end, one wheel meshing into the wheel on the end of the twister shaft, and the other gearing with a horizontal shaft supported within the frame A, and revolved by the band l', Fig. 1, running over a wheel on the shaft J. The dotted wheel m', Fig. 1, indicates the position of the wheel on the opposite side of the frame A, round which the band l' passes.

The springs a' b' c', connected with the binder H, have screws for regulating their elasticity, (one being shown in Fig 5,) and the faces of the two first are roughened to increase their power of holding the wires.

The hand H' of the binding apparatus is attached to an arm which moves up and down in the frame C, and to this arm is attached the pitman G, connecting with the lever f. The position which the short lever f and the hand H' take, as the former is released from the hook a, is shown by dotted lines in Fig. 4, and the position of the rods h h, after they are dropped, is also shown by dotted lines in the same figure.

Behind the binding apparatus, and suspended from the frame C, is a fly-rake, T, the fingers of which project downward. As the grain is carried forward by the rake, the fingers of this fly-rake are turned upward and forward, but as soon as the grain has passed the binder, and before the hand H' is pressed down, the fingers of this rake are thrown backward and downward by the coiled spring o', placed around the head of the rake, and brush or rake away all loose straw from under the hand H' and between it and the binder H.

Connected also with the binding apparatus is a guide, U, which is a thin metal plate, forked or slitted nearly its whole length, as shown in Figs. 1 and 7, fixed in a small roller, p', around which is a spiral spring. This guide is placed on the apron, behind the binder, and is turned down horizontally by the grain as it is carried along by the rake. As it is being so turned down, its slitted end strides the wire or band, guiding it in the proper direction, so that the grain will more easily pass within, and so that the binder and hand H' will more surely act on it. As soon as the grain passes off this guide-plate, the coiled spring about its roller p' throws it into its perpendicular position, in taking which it also removes any loose straws that may be between the parts of the binder. The drawings represent this guide as shorter than the binder, but it in fact extends, when in a horizontal position, entirely across the binder.

As one bundle after another is bound, it is moved onto the carrier P by the succeeding ones, until the carrier is disconnected, as before described, and the bundles are deposited in a bunch on the ground. The pieces X X are raised as the bundles are pushed on the carrier, and serve to keep the bundles on the carrier as the machine moves along.

The frame C should extend a foot or so beyond the frame A in the direction of the reaper, so that the cut ends of the grain, as the rake gathers and moves it forward, will pass through the binder without catching against such frame C.

The two cranks on the shaft J are placed at such angles with respect to each other that the lever F is at its extreme highest position just at the time the rake Q reaches its extreme forward position.

This machine is moved by gearing connected, through the wheel $w'$ on shaft J, with the gearing of the reaper. In order that the machine and reaper can accommodate themselves to any inequalities of position produced by uneven ground, &c., it will be necessary to place in the shaft J a knuckle or universal joint, which must be slitted lengthwise, so as to allow of the lengthening and shortening of such shaft.

What I claim as my invention, and desire to secure by Letters Patent, is—

The combination and arrangement, in connection with a grain reaper, of the rake Q Q, binder H H', and carrier P, constructed and operating, severally and in combination with each other, substantially as set forth, whereby the grain, as fast as it is cut, is carried by the rake to the binder, by which it is bound into bundles and then delivered onto the carrier, by which the bundles are carried along with machine until a bunch or shock is gathered, when they are deposited together on the ground, the rake, binder, and carrier being operated by the reaper, and the action of the whole machine being substantially as described.

THOMAS CURTIS.

Witnesses:
S. D. LAW.
ALONZO C. FARNHAM.